United States Patent
Inoue

(10) Patent No.: US 7,852,562 B2
(45) Date of Patent: Dec. 14, 2010

(54) OPTICAL ELEMENT WITH LASER DAMAGE SUPPRESSION FILM

(75) Inventor: Yasuaki Inoue, Osaka (JP)

(73) Assignee: Nalux Co., Ltd., Osaka (JP)

( * ) Notice: Subject to any disclaimer, the term of this patent is extended or adjusted under 35 U.S.C. 154(b) by 547 days.

(21) Appl. No.: 11/885,154

(22) PCT Filed: Feb. 2, 2006

(86) PCT No.: PCT/JP2006/002437

§ 371 (c)(1),
(2), (4) Date: Nov. 1, 2007

(87) PCT Pub. No.: WO2006/092949

PCT Pub. Date: Sep. 8, 2006

(65) Prior Publication Data

US 2008/0192349 A1    Aug. 14, 2008

(30) Foreign Application Priority Data

Feb. 28, 2005    (JP) .............................. 2005-054023

(51) Int. Cl.
*G02B 1/10*    (2006.01)

(52) U.S. Cl. .................. 359/582; 359/586; 359/588

(58) Field of Classification Search .............. 359/580, 359/582, 586, 588, 589
See application file for complete search history.

(56) References Cited

U.S. PATENT DOCUMENTS

| | | | |
|---|---|---|---|
| 4,895,767 A | 1/1990 | Mori et al. | |
| 6,232,407 B1 | 5/2001 | Hashidzume et al. | |
| 2003/0017316 A1 | 1/2003 | Pfaff et al. | |
| 2003/0203210 A1* | 10/2003 | Graff et al. .................. | 428/412 |
| 2003/0215575 A1* | 11/2003 | Martin et al. ............. | 427/407.1 |
| 2005/0180010 A1* | 8/2005 | Mukaiyama et al. ........ | 359/497 |
| 2009/0252862 A1 | 10/2009 | Inoue | |

FOREIGN PATENT DOCUMENTS

| JP | 07198926 A | 8/1995 |
|---|---|---|
| JP | 11-030703 | 2/1999 |
| JP | 11-171596 | 6/1999 |
| JP | 11-326634 | 11/1999 |
| JP | 2000-6181 | 1/2000 |
| JP | 2001198710 A | 7/2001 |
| JP | 2002-55207 | 2/2002 |
| JP | 2002-071903 | 3/2002 |
| JP | 2003-098308 | 4/2003 |
| JP | 2003-248102 | 9/2003 |
| JP | 2005076095 A | 3/2005 |

* cited by examiner

*Primary Examiner*—Joshua L Pritchett
(74) *Attorney, Agent, or Firm*—Squire, Sanders & Dempsey, LLP

(57) ABSTRACT

An optical element having a laser damage suppression film which is capable of withstanding high power blue laser and formed on a plastic substrate. Specifically disclosed is an antireflection optical element wherein a multilayer film, which is composed of low refractive index material layers (105) and high refractive index material layers (107) arranged alternately, is formed on a plastic substrate. In this antireflection optical element, the oxygen permeability coefficient is decreased such that variation in laser permeability is 2% or less after being continuously irradiated with blue laser having an energy density of 120 mW/mm$^2$ for 1000 hours at an ambient temperature of 25° C. In one embodiment, the oxygen permeability coefficient is set at 30 cm$^3$·mm m$^2$·24 hr·atm) or less.

1 Claim, 7 Drawing Sheets

OPTICAL ELEMENT WITH LASER DAMAGE SUPPRESSION FILM

TECHNICAL FIELD

The present invention relates to an optical element having a damage suppression film formed on a substrate consisting of a blue-laser-coping plastic material. In particular, the present invention relates to an optical element having a laser damage suppression film used in a short-wavelength, high-power (30 $mW/mm^2$ or more) blue laser.

BACKGROUND ART

A short-wavelength, high-power blue laser is expected to be more widely used in an optical pickup or the like. In general, plastic is easily damaged by a laser. Therefore, some optical parts of devices using a short-wavelength, high-power blue laser consist of glass instead of plastic to avoid damage by a laser. For this reason, the prices of devices are relatively high. The relatively high prices are a hurdle to be overcome to enlarge the market of the devices.

At present, plastic materials which can cope with a relatively-low-power blue laser are supplied from various material manufacturers. However, there is no plastic material which can withstand a high-power blue laser.

On the other hand, an antireflection film is frequently formed on surfaces of plastic lenses used in video camcorders, still cameras, glasses, and the like. Such an antireflection film consists of a multi-layered film obtained by alternatively stacking low-refractive-index layers and high-refractive-index layers. The multi-layered film is described in Japanese Patent Application Laid-Open Nos. 11-30703, 11-171596, 11-326634, 2002-71903, 2003-98308, 2003-248102, and the like. However, a conventional antireflection film cannot prevent a damaged caused by a high-power blue laser.

Since there is no plastic material which can withstand a high-power blue laser, in order to realize an optical element which can withstand a high-power blue laser using a plastic material, a method of forming a laser damage suppression film such as an antireflection film on a surface of a substrate consisting of a plastic material may be used.

DISCLOSURE OF THE INVENTION

In the background art, there is a need for an optical element having a laser damage suppression film which can withstand a high-power blue laser, on a plastic substrate.

An optical element according to the present invention is an antireflection optical element having a multi-layered film obtained by alternately stacking layers consisting of a low-refractive-index material and layers consisting of a high-refractive-index material on a plastic substrate, wherein an oxygen permeability coefficient is decreased such that an amount of change in laser transmittance obtained after a blur laser having an energy density of 120 $mW/mm^2$ is continuously irradiated at an ambient temperature of 25° C. for 1000 hours is 2% or less.

Since the optical element according to the present invention has a small oxygen permeability coefficient, the optical element is not easily damaged by irradiation of a blue laser.

BEST MODE FOR CARRYING OUT THE INVENTION

Figure 1:
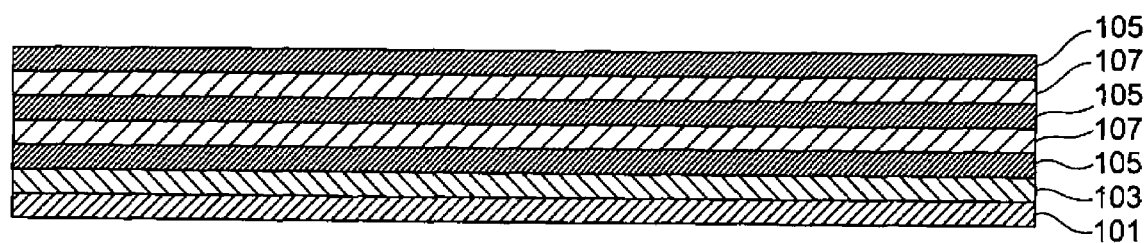
FIG. 1 is a diagram showing a configuration of an optical element having a laser damage suppression film according to a first embodiment of the present invention.

FIG. 1 is a diagram showing a configuration of an optical element having a laser damage suppression film according to a first embodiment of the present invention. In FIG. 1, a layer 103 consisting of silicon monoxide (SiO) is formed on a substrate 101 consisting of a blue-laser-coping plastic material. The layer 103 consisting of silicon monoxide functions to improve adhesiveness between the substrate 101 consisting of a plastic material and a layer formed thereon. On the layer 103 consisting of silicon monoxide, layers 105 consisting of a low-refractive-index material and layers 107 consisting of a high-refractive-index material are alternately stacked. In the embodiment, three layers 105 consisting of low-refractive-index material and two layers 107 consisting of high-refractive-index material are formed.

In this case, the blue-laser-coping plastic material is an olefin-based material. More specifically, the material is a thermoplastic transparent resin cycloolefin polymer having an antioxidant function.

The layer 103 consisting of silicon monoxide is formed on the substrate 101 by a vacuum deposition method. In the vacuum deposition method, a material (in this case, silicon monoxide) to be formed as a thin film is heated by a resistance wire or by irradiating an electron beam on the material, and evaporated. The evaporated material is caused to attach (deposited) on the substrate to form a thin film. The thickness of the layer 103 consisting of silicon monoxide is about several hundred nanometers.

The low-refractive-index material is silicon dioxide ($SiO_2$) in this embodiment. The refractive index of the layer 105 consisting of silicon dioxide is 1.4 to 1.5. The layer 105 consisting of silicon dioxide is formed by the vacuum deposition method. The thickness of the layer 105 consisting of silicon dioxide is several ten nanometers to several hundred nanometers.

The high-refractive-index material is obtained by adding a slight amount of titanium dioxide ($TiO_2$) to tantalum pentoxide ($Ta_2O_5$) in the embodiment. The refractive index of the layer 107 consisting mainly of tantalum pentoxide is 2.0 to 2.3. The layer 107 consisting mainly of tantalum pentoxide is formed by an ion plating method. The ion plating method is a method for ionizing some evaporated particles by using gas plasma and depositing them on a substrate biased to a negative high voltage. Since the material to be deposited is accelerated by an electric field and attached to the substrate, a film having high adherence is obtained. A thickness of the layer 107 consisting mainly of tantalum pentoxide is several ten nanometers to several hundred nanometers.

As the material of the layer 107, $Ta_xO_y$, where values of x and y are properly determined can be used.

As the high-refractive-index material, a titanium-oxide-based material can also be used.

Layers having different refractive indexes may be alternately stacked to constitute a large number of reflective surfaces. External lights reflected by the large number of reflective surfaces may interfere with one another and may be canceled out to obtain an antireflection effect. Optical path lengths (=layer thicknesses and refractive indexes) of the layers may be different from one another to generate interference in a wide wavelength range, so that an antireflection effect can be obtained in a wide wavelength range of external lights. In this manner, the multi-layered film may include not only the laser damage suppression function but also the antireflection function.

Figure 4:
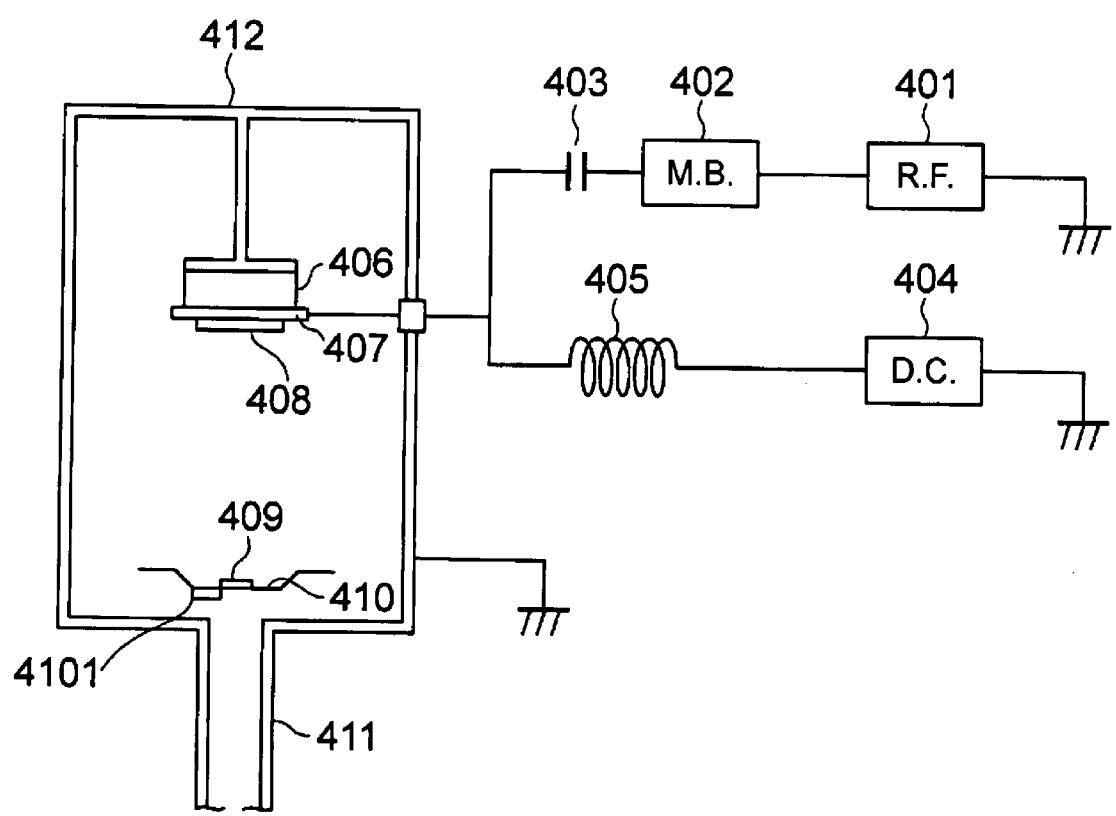
FIG. 4 is a diagram showing a configuration of an ion plating apparatus to practice an ion plating method.

FIG. 4 is a diagram showing a configuration of an ion plating apparatus to practice the ion plating method. The ion plating apparatus is disclosed in Japanese Patent Application Laid-Open No. 1-48347, for example. In a vacuum chamber 412, a base material holder 407 consisting of a conductive material and supporting a base material 408, and a support member consisting of a conductive material and supporting the base material holder via an insulating material, constitute a capacitor 406.

A high-frequency power supply 401 is connected between the vacuum chamber 412 and the base material holder 407 via a blocking capacitor 403 and a matching box 402 to supply a high-frequency voltage. A DC power supply 404 is connected between the vacuum chamber 412 and the base material holder 407 via a choke coil 405 such that the base material holder 407 is on a negative side to supply a DC bias voltage. An output from the high-frequency power supply 401 is 500 W, and a voltage of the DC power supply 404 is 100 V.

An output from the high-frequency power supply 401 preferably ranges from 300 to 900 W. In this range, an output value can be adjusted to improve the denseness of the film.

The capacitor 406 operates together with the matching box 402 connected to the high-frequency power supply 401 which supplies a high-frequency voltage into the vacuum chamber 412 to perform matching, and thus a stable electric field can be made and maintained between a material to be evaporated 409 on a resistor heating board 410 and the base material 408. As a result, a thin film having high purity, high density, and high adhesiveness can be formed on the surface of the base material 408.

An electron gun 4101 for electron beam heating is installed under a crucible including the resistor heating board 410.

An outline of a film forming method will be shown in the following table.

TABLE 1

| | Film Configuration | $O_2$ Introduction Pressure Setting (Pa) | Film Deposition Rate Setting | Film Thickness (measure) | Deposition Time (minute) (measure) | Evaporation Source | Plasma Generation |
|---|---|---|---|---|---|---|---|
| First Layer | SiO | 2.80E−02 | 3.0 Å/S | 2440 Å | 13.5 | RH | None |
| Second Layer | $SiO_2$ | 6.00E−03 | 10.0 Å/S | 1650 Å | 2.8 | EB | None |
| Third Layer | Tantalum-oxide-based material | 2.00E−02 | 3.0 Å/S | 125 Å | 1.7 | EB | Present |
| Fourth Layer | $SiO_2$ | 6.00E−03 | 10.0 Å/S | 300 Å | 0.6 | EB | None |
| Fifth Layer | Tantalum-oxide-based material | 2.00E−02 | 3.0 Å/S | 330 Å | 1.8 | EB | Present |
| Sixth Layer | $SiO_2$ | 6.00E−03 | 10.0 Å/S | 630 Å | 2 | EB | None |

The absence of plasma generation means that the high-frequency power supply 401 and the DC power supply 404 are not used. In this case, a film is formed by the vacuum deposition method.

In this table, RH denotes resistance heating, and EB denotes electron beam heating.

In film formation, oxygen is introduced into the vacuum chamber 412 by a valve (not shown). The oxygen introduction pressure setting is setting of an oxygen pressure in the chamber. An oxygen partial pressure preferably ranges from $3.0 \times 10^{-3}$ to $5.0 \times 10^{-2}$ Pa. When the oxygen partial pressure is adjusted in this range, a rate of change of light intensity of an optical element (to be described later) can be set at an appropriate value. A gas in the vacuum chamber 412 is exhausted from an exhaust port 411.

In comparison with the optical element according to the embodiment shown in FIG. 1, optical elements (first and second comparative examples) of two types shown in the following Table 2 were prepared.

TABLE 2

| | This Embodiment | First Comparative Example | Second Comparative Example |
|---|---|---|---|
| Material of Substrate | Blue-laser-coping plastic | PMMA-based plastic | Blue-laser-coping plastic |
| Film Forming Method of High-refractive-index Material Layer | Ion plating method | Ion plating method | Vacuum deposition method |

Furthermore, as a third comparative example, there was prepared an optical element consisting of blue-laser-coping plastic having a surface on which any coating was not performed.

Figure 2:
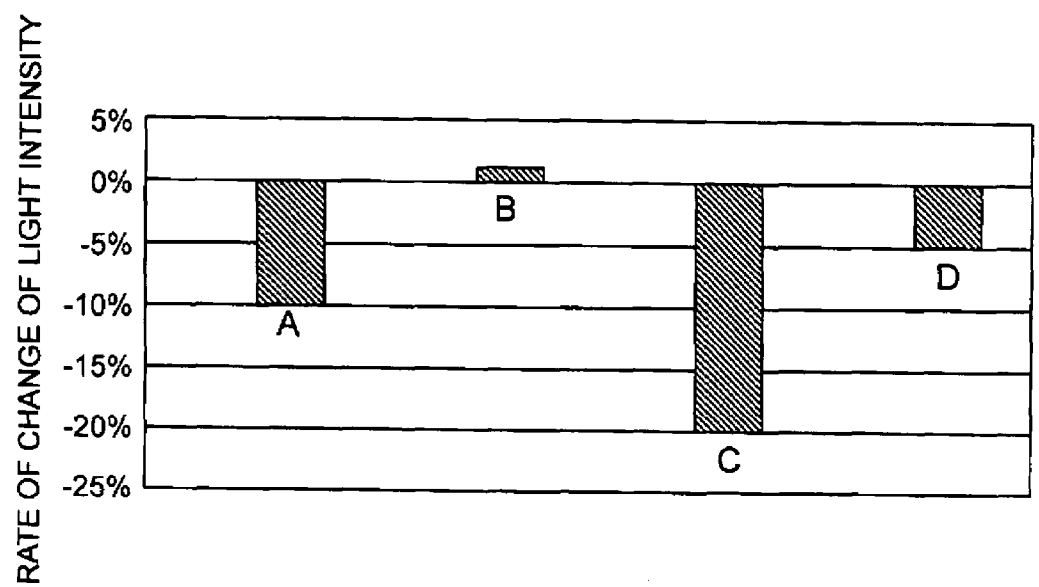
FIG. 2 is a graph showing a result obtained by measuring a rate of change of light intensity of an optical element after a blue laser is irradiated on the optical element for 1000 hours.

FIG. 2 is a graph showing a result obtained by measuring a rate of change of light intensity of an optical element after a blue laser is irradiated on the optical element at an ambient temperature of 25° C. for 1000 hours. The energy density of blue laser irradiation is about 120 mW/mm². In this case, a rate of change of light intensity of the optical element can be expressed by the following equation.

Rate of change of light intensity=((transmittance after irradiation/transmittance before irradiation)−1)
·100%

As an example, when the transmittance before irradiation is 90% and the transmittance after irradiation is 80%, the rate of change of light intensity is given by:

((0.80/0.90)−1)·100=−11.1%

Reference symbol B in FIG. 2 indicates a measurement result of a rate of change of light intensity of the optical element according to the embodiment. Reference symbol A in FIG. 2 indicates a measurement result of a rate of change of light intensity of the first comparative example. Reference symbol C in FIG. 2 indicates a measurement result of a rate of change of light intensity of the second comparative example. Reference symbol D in FIG. 2 indicates a measurement result of a rate of change of light intensity of an optical element according to the third comparative example. The optical element according to the third comparative example is irradiated with a blue laser in a nitrogen atmosphere.

Figure 3:
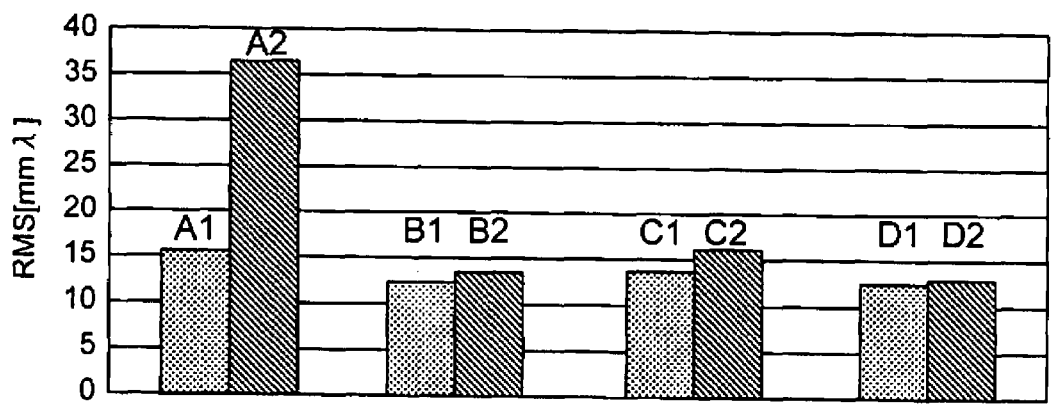
FIG. 3 is a graph showing results obtained by measuring total wavefront aberrations (RMS) of the optical element before and after the blue laser is irradiated on the optical element for 1000 hours.

FIG. 3 is a graph showing results obtained by measuring total wavefront aberrations (RMS) of optical elements before and after the blue laser is irradiated on the optical element at an ambient temperature of 25° C. for 1000 hours. An energy density of blue laser irradiation is about 120 mW/mm².

The total wavefront aberration is obtained by expressing a misalignment of a wavefront from a reference sphere by a standard deviation. In this case, the reference sphere is a sphere which intersects with an optical axis at the center of entrance and exit pupils such that a principal ray is focused on. In measurement of the total wavefront aberration, an interference band is generated by an interferometer. The wavefront aberration is calculated from a map of the interference band.

Reference symbols B1 and B2 in FIG. 3 indicate measurement results of total wavefront aberrations of the optical element according to the present embodiment. Reference symbols A1 and A2 in FIG. 3 indicate measurement results of total wavefront aberrations in the first comparative example. Reference symbols C1 and C2 in FIG. 3 indicate measurement results of total wavefront aberrations in the second comparative example. Reference symbols D1 and D2 in FIG. 3 indicate measurement results of total wavefront aberrations of the optical element according to the third comparative example. The optical element according to the third comparative example is irradiated with a blue laser in a nitrogen atmosphere. Reference symbols A1, B1, C1, and D1 indicate measurement results of total wavefront aberrations before the blue laser is irradiated, while reference symbols A2, B2, C2, and D2 indicate measurement results of total wavefront aberrations after the blue laser is irradiated.

The following points will be apparent from the measurement results in FIGS. 2 and 3. In the present embodiment, even after it has been irradiated with a high-power blue laser for 1000 hours, the light intensity remains almost unchanged. Furthermore, the total wavefront aberrations after the irradiation remain almost unchanged in comparison with those before the irradiation.

The rate of change of light intensity decreases by about 10% in the first comparative example (A in FIG. 2), about 20% in the second comparative example (C in FIG. 2), and about 5% in the third comparative example (D in FIG. 2). In the second comparative example in which the ion plating method is not used in formation of a high-refractive-index layer (C in FIG. 2), the rate of change of light intensity is high. More specifically, a light transmittance intensity of the optical element considerably decreases. The light transmittance intensity of the optical element decreases for the following reason. That is, when a high-power blue laser is irradiated for a long period of time, chemical bonds of the plastic serving as a polymer may be broken (damaged) to change a bonding state. When the ion plating method is used in formation of a high-refractive-index layer, the above damage is suppressed.

When the coat-less optical element according to the third comparative example is placed in a nitrogen atmosphere, a decrease in light transmittance intensity is relatively small. Then, it is inferred that a material except for nitrogen in the air should accelerate damage of the optical element. Therefore, it can be considered that a rate of mixing the material in the air which accelerates damage of the optical element into the optical element can be decreased by using the ion plating method in formation of a high-refractive-index layer.

The total wavefront aberration obtained after irradiation of the high-power blue laser is about 2.5 times that in the first comparative example (A1 and A2 in FIG. 3) in which a PMMA-based plastic is used. The total wavefront aberration obtained after irradiation of a high-power blue laser remains almost unchanged in the second and third comparative examples. For this reason, in the optical element using a blue-laser-coping plastic, it is considered the shape of the optical element surface remains almost unchanged. On the other hand, in the optical element using the PMMA-based plastic, it is considered the total wavefront aberration may increase because the shape of the optical element surface has changed.

In the embodiment, film is formed by the ion plating method. However, the film may be formed while a plasma state is generated by a plasma CVD method, an ion beam assist deposition method, sputtering method or the like.

The present invention is characterized in that a film is formed on a substrate consisting of a blue-laser-coping plastic material by a plasma generating method such as an ion plating method.

According to the characteristic, the above remarkable effect is achieved with respect to suppression of damage of the optical element caused by a laser. A mechanism which achieves the effect is considered as follows.

A catalytic action which operates to create an action having oxidation decomposition from moisture or oxygen may be suppressed by using a substrate consisting of a thermoplastic transparent resin cycloolefin polymer having an antioxidant function and by increasing a film denseness by film formation by the ion plating method (forming an oxygen impermeability film). Therefore, it can be presumed that substrate damage by a blue laser beam is suppressed. A ground for causing this presumption is also expected from the measurement result (D in FIG. 2) of a rate of change of light intensity when a laser irradiation experiment is performed in a nitrogen atmosphere. It is considered that use of tantalum oxide in film formation by the ion plating method further improves the denseness of the film.

As another embodiment, a multi-layered film formed by the following film forming method will be described below. The multi-layered film formed by this film forming method is called improved film 1.

TABLE 3

| | Film Configuration | $O_2$ Introduction Pressure Setting (Pa) | Ar Introduction Pressure Setting (Pa) | Film Deposition Rate Setting | Film Thickness (measure) | Deposition Time (minute) (measure) | Evaporation Source | Plasma Generation |
|---|---|---|---|---|---|---|---|---|
| First Layer | SiO | 2.80E−02 | | 3.0 Å/S | 2440 Å | 13.5 | RH | None |
| Second Layer | $SiO_2$ | | 6.00E−03 | 10 Å/S | 1650 Å | 2.8 | EB | Present |
| Third Layer | Tantalum-oxide-based material | 3.00E−02 | | 3.0 Å/S | 125 Å | 1.7 | EB | Present |
| Fourth Layer | $SiO_2$ | | 6.00E−03 | 10 Å/S | 300 Å | 0.6 | EB | Present |
| Fifth layer | Tantalum-oxide-based material | 3.00E−02 | | 3.0 Å/S | 330 Å | 1.8 | EB | Present |
| Sixth Layer | $SiO_2$ | | 6.00E−03 | 10 Å/S | 630 Å | 1.0 | EB | Present |
| | | | | Total Film Thickness | 5475 Å | | | |

A film forming method in Table 3 is different from the film forming method in Table 1 in that a low-refractive-index layer consisting of silicon dioxide is formed in an argon atmosphere while generating a plasma state. An argon partial pressure in formation of the low-refractive-index layer preferably ranges from $3.0 \times 10^{-3}$ to $5.0 \times 10^{-2}$ Pa. When the low-refractive-index layer is formed in an argon atmosphere while generating a plasma state, even though a substrate is exposed to a high-temperature environment (for example, 85° C.) or a high-temperature and high-humidity environment (for example, 60° C. and 90%) for a long time, an amount of change in transmittance is almost zero. The argon atmosphere is more advantageous than an oxygen plasma atmosphere.

As still another embodiment, a multi-layered film formed by the following film forming method will be described below. The multi-layered film formed by this film forming method is called improved film 2.

TABLE 4

| | Film Configuration | $O_2$ Introduction Pressure Setting (Pa) | Ar Introduction Pressure Setting (Pa) | Film Deposition Rate Setting | Film Thickness (measure) | Deposition Time (minute) (measure) | Evaporation Source | Plasma Generation |
|---|---|---|---|---|---|---|---|---|
| First Layer | Tantalum-oxide-based material | 3.00E−02 | | 3.0 Å/S | 120 Å | 0.8 | EB | Present |
| Second Layer | SiO2 | | 6.00E−03 | 10 Å/S | 230 Å | 0.3 | EB | Present |
| Third Layer | Tantalum-oxide-based material | 3.00E−02 | | 3.0 Å/S | 840 Å | 4.8 | EB | Present |
| Fourth Layer | SiO2 | | 6.00E−03 | 10 Å/S | 630 Å | 1.0 | EB | Present |
| | | | | Total Film Thickness | 1820 Å | | | |

Improved film 2 does not include an adhesion layer consisting of silicon monoxide but includes a layer consisting of a tantalum-oxide-based material as a first layer on the substrate. The total film thickness of improved film 1 is 547.5 nm, whereas the total film thickness of improved film 2 is 182.0 nm. In a diffraction optical element having a surface on which a fine structure is formed, when a film thickness is large, influence on the shape of the fine structure increases. Since improved film 2 is thin, influence on the shape of the fine structure is small.

A multi-layered film having the same structure as that of improved film 1, formed by a vacuum deposition method which does not generate plasma, is called a conventional film.

A substrate which is not a nitrogen shaping substrate (will be described later) and which consists of a thermoplastic transparent cycloolefin polymer is called a conventional substrate.

Figure 5:
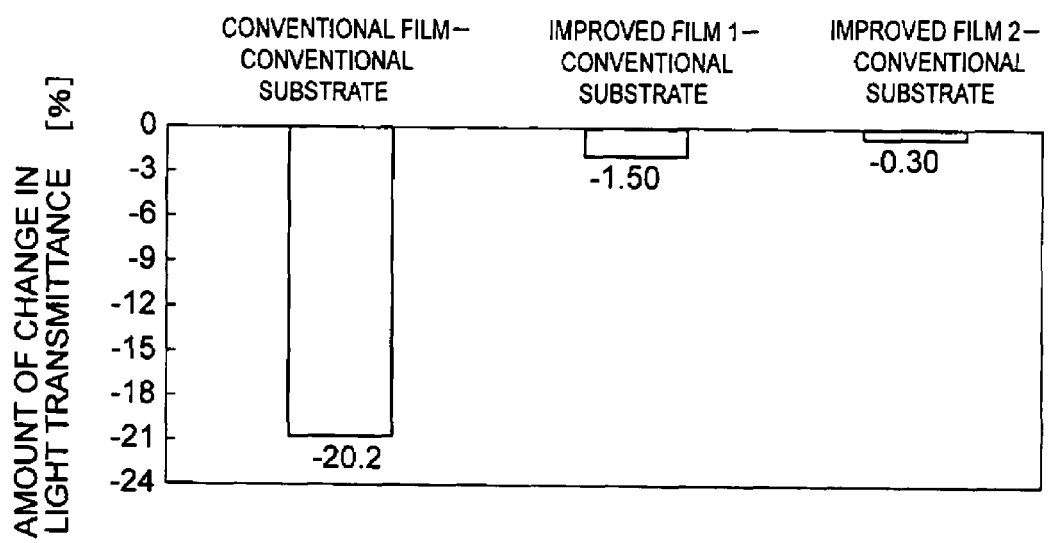
FIG. 5 is a graph showing an amount of change in light transmittance of an optical element obtained by forming a conventional film on a conventional substrate and an optical element obtained by forming improved films 1 and 2 on the conventional substrate.

FIG. 5 is a graph showing an amount of change in light transmittance of an optical element obtained by forming a conventional film on a conventional substrate and optical elements obtained by forming improved films 1 and 2 on the conventional substrates. The amounts of change in light transmittance of the optical elements in which improved films 1 and 2 are formed are considerably improved in comparison with the amount of change in light transmittance of the optical element in which the conventional film is formed.

Figure 6:
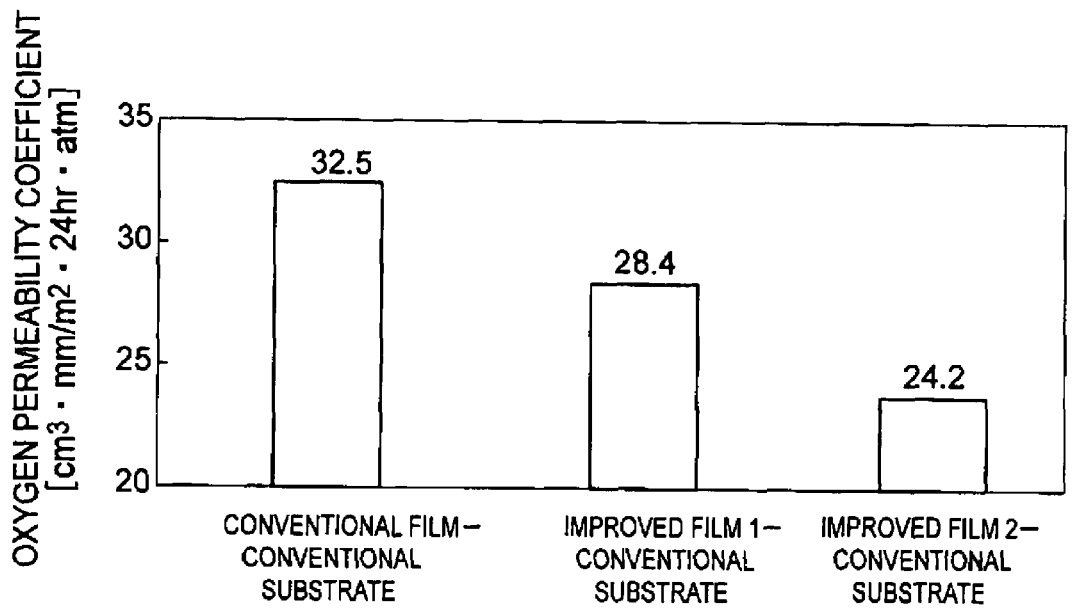
FIG. 6 is a graph showing oxygen permeability coefficients of the optical element obtained by forming the conventional film on the conventional substrate and the optical element obtained by forming improved films 1 and 2 on the conventional substrate.

FIG. 6 is a graph showing oxygen permeability coefficients of the optical element obtained by forming the conventional film on the conventional substrate and the optical element obtained by forming improved films 1 and 2 on the conventional substrate. In general, a gas permeability coefficient can be expressed by the following equation:

Gas permeability coefficient=gas permeability quantity (volume in normal state)×thickness/(pressure difference×permeability area×time)

In FIG. 6, a unit of the oxygen permeability coefficient is $cm^3 \cdot mm/(m^2 \cdot 24\ hr \cdot atm)$.

Oxygen permeability coefficients of the optical elements obtained by forming improved films 1 and 2 on the conventional substrate are smaller than the oxygen permeability coefficient of the optical element obtained by forming the conventional film on the conventional substrate. The optical elements obtained by forming improved films 1 and 2 on the conventional substrate do not easily transmit oxygen.

As a result, it is presumed that when the optical element is irradiated with a blue laser, deterioration of the substrate material is accelerated by a chemical reaction caused by the medium of oxygen and that the amount of change in light transmittance increases. This presumption conforms to the fact that a decrease in light transmittance is relatively small when the uncoated optical element of the third comparative example is placed in a nitrogen atmosphere.

More specifically, when a multi-layered film having a small oxygen permeability coefficient is formed, the amount of change in light transmittance of the optical element can be suppressed.

Figure 7:
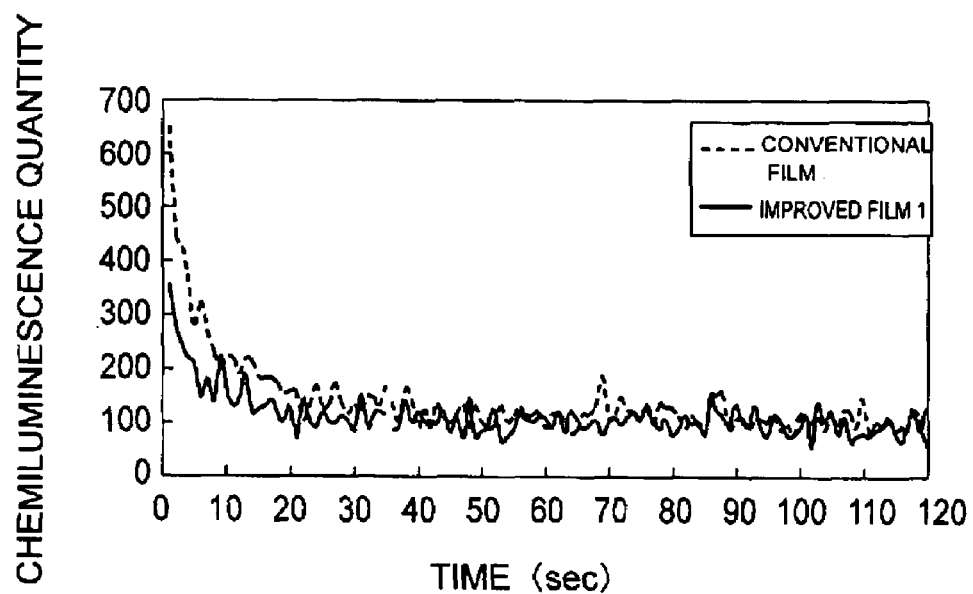
FIG. 7 is a graph showing a change in chemiluminescence quantity after a blue laser is irradiated on the optical element obtained by forming the conventional film on the conventional substrate and the optical element obtained by forming improved film 1 on the conventional substrate and then stopped.
Figure 8:
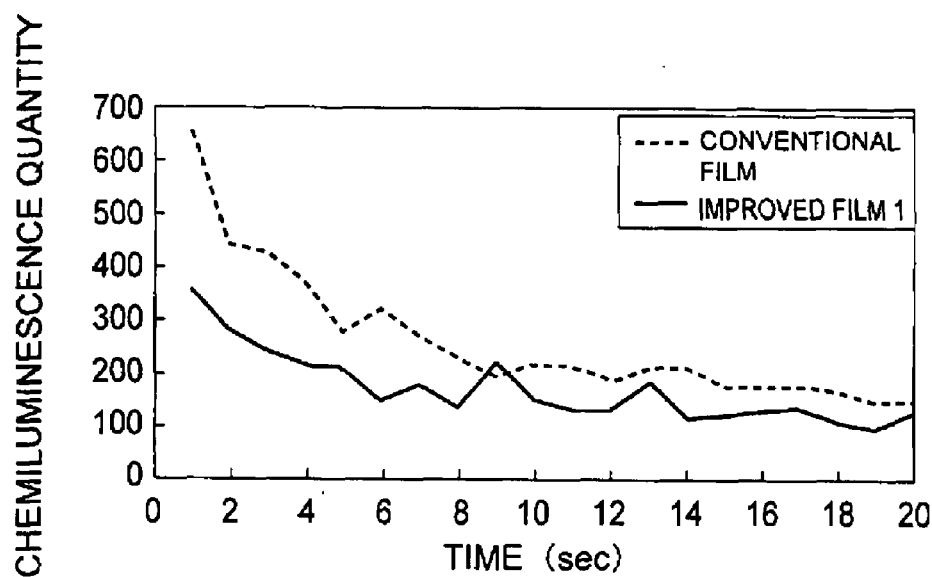
FIG. 8 is a graph showing a part of FIG. 7 in which a time axis is enlarged.

FIG. 7 is a graph showing a change in chemiluminescence quantity after a blue laser is irradiated on the optical element obtained by forming the conventional film on the conventional substrate and the optical element obtained by forming improved film 1 on the conventional substrate and then stopped. FIG. 8 is a graph showing a part of FIG. 7 in which a time axis is enlarged. In FIGS. 7 and 8, the chemiluminescence quantity indicates a relative magnitude. For 20 seconds after the stop of irradiation, the chemiluminescence quantity of the optical element obtained by forming the conventional film on the conventional substrate is larger than the chemiluminescence quantity of the optical element obtained by forming improved film 1 on the conventional substrate. It is said that chemiluminescence is caused by a reaction by the medium of oxygen. It is considered that the optical element obtained by forming improved film 1 on the conventional substrate suppresses a chemical reaction of a substrate material caused by the medium of oxygen because the optical element has an oxygen permeability coefficient smaller than that of the optical element obtained by forming the conventional film on the conventional substrate and does not easily transmit oxygen.

Figure 9:
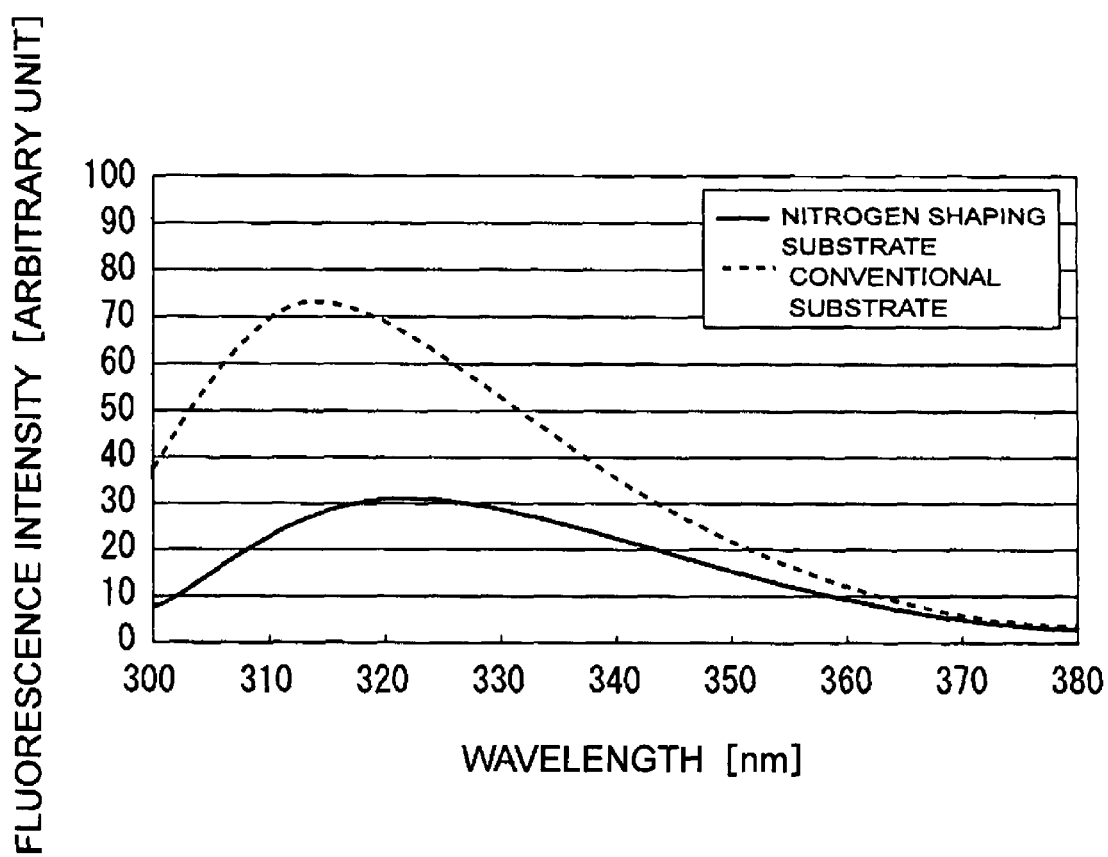
FIG. 9 is a graph showing amounts of change in light transmittance of the conventional substrate and a nitrogen shaping substrate.

FIG. 9 is a graph showing a quantity of fluorescence of the conventional substrate and a nitrogen shaping substrate at a wavelength of about 320 nm in excitation at a wavelength of 280 nm. The nitrogen shaping substrate is a substrate which is shaped in a nitrogen atmosphere such that a thermoplastic transparent resin cycloolefin polymer is dried in a nitrogen atmosphere and transported in the nitrogen atmosphere. In FIG. 9, the quantity of fluorescence is an arbitrary unit and indicates a relative magnitude. Since the fluorescence is caused by the medium of oxygen, the reason why the quantity of fluorescence of the nitrogen shaping substrate is small is considered to be that the nitrogen shaping substrate has an amount of absorbed oxygen smaller than that of the conventional substrate.

Figure 10:
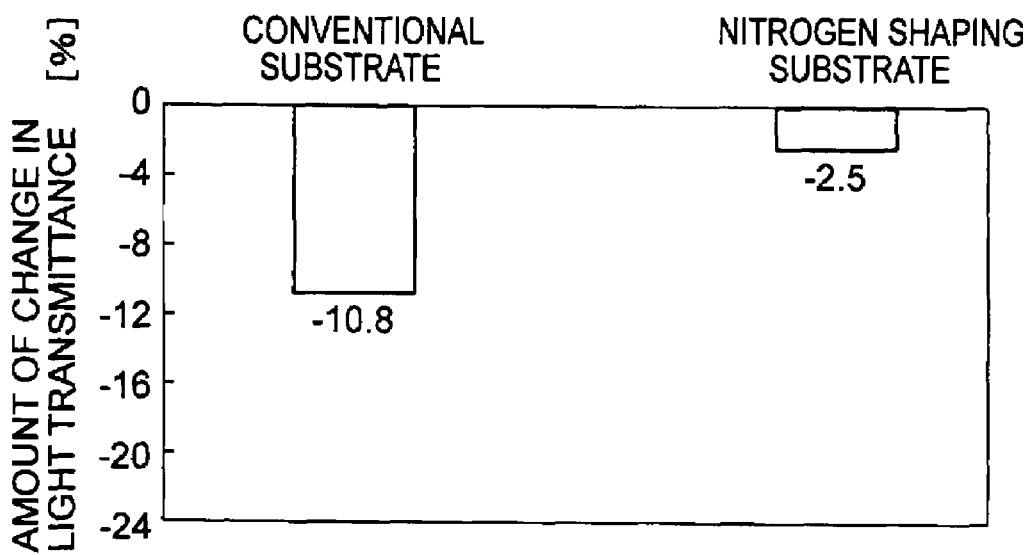
FIG. 10 is a graph showing fluorescence quantities of the conventional substrate and the nitrogen shaping substrate at a wavelength of about 320 nm in excitation at a wavelength of 280 nm.

FIG. 10 is a graph showing amounts of change in light transmittance of the conventional substrate and the nitrogen shaping substrate. The amount of change in light transmittance of the nitrogen shaping substrate is considerably smaller than the amount of change in light transmittance of the conventional substrate. In this manner, the nitrogen shaping substrate is not easily damaged by irradiation of a blue laser in comparison with the conventional substrate.

It is considered that damage caused by irradiation of a blue laser proceeds by a chemical reaction caused by the medium of oxygen. Therefore, since the nitrogen shaping substrate has an amount of absorbed oxygen smaller than that of the conventional substrate, it is considered that the nitrogen shaping substrate is not easily damaged by irradiation of a blue laser.

Figure 11:
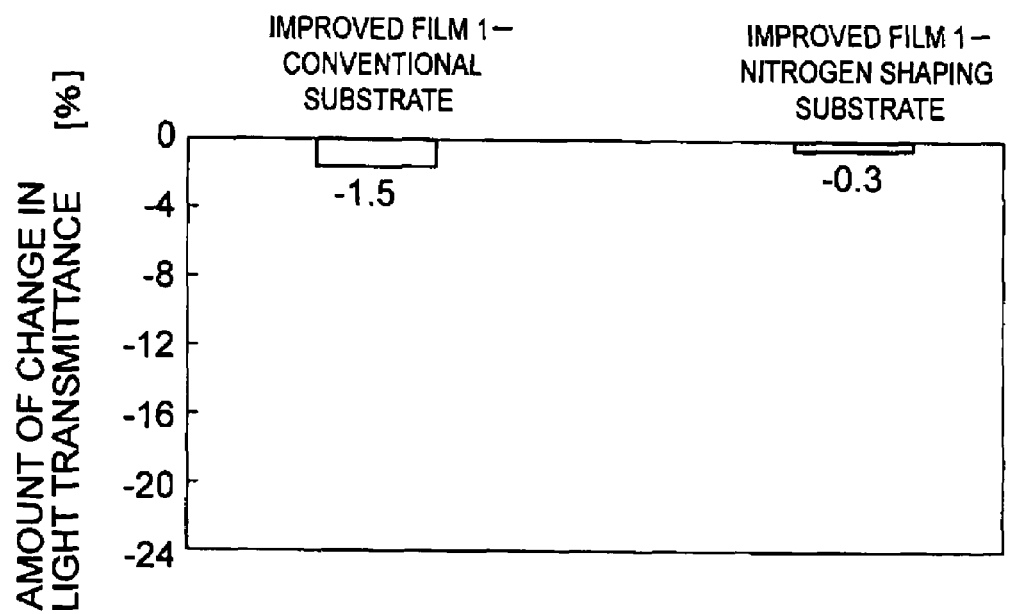
FIG. 11 is a graph showing amounts of change in light transmittance of the optical element obtained by forming improved film 1 on the conventional substrate and the optical element obtained by forming improved film 1 on the nitrogen shaping substrate.

FIG. 11 is a graph showing amount s of change in light transmittance of the optical element obtained by forming improved film 1 on the conventional substrate and the optical element obtained by forming improved film 1 on the nitrogen shaping substrate. Since the nitrogen shaping substrate having a small amount of absorbed oxygen and improved film 1 which does not easily transmit oxygen are combined, the amount of change in light transmittance can be suppressed to a very low level.

The invention claimed is:

1. A method for producing an antireflection optical element for use with a high power blue laser, having a multi-layered film obtained by alternately stacking layers consisting of a low-refractive-index material and layers consisting of a high-refractive-index material on a plastic substrate, wherein producing conditions are determined in such a way that plasma is generated while the layer consisting of the high-refractive-index material is formed and the produced optical element may have an oxygen permeability coefficient that is 30 $cm^3 \cdot mm/(m^2 \cdot 24 hr \cdot atm)$ or less such that an amount of change in laser permeability obtained after a blue laser having an energy density of 120 $mW/mm^2$ is continuously irradiated at an ambient temperature of 25° C. for 1000 hours is 2% or less.

* * * * *